United States Patent [19]

Nayberg et al.

[11] Patent Number: 4,581,692
[45] Date of Patent: Apr. 8, 1986

[54] DIRECT CURRENT VOLTAGE CONVERTER APPARATUS

[75] Inventors: David Nayberg; Warren C. Fry, both of Pittsburgh, Pa.

[73] Assignee: Westinghouse Electric Corp., Pittsburgh, Pa.

[21] Appl. No.: 657,558

[22] Filed: Oct. 4, 1984

[51] Int. Cl.[4] .......................................... H02M 3/315
[52] U.S. Cl. ........................................ 363/27; 363/96; 320/1
[58] Field of Search ...................... 363/27, 28, 96, 97, 363/98; 307/110; 320/1

[56] References Cited

U.S. PATENT DOCUMENTS

| | | | |
|---|---|---|---|
| 3,886,434 | 4/1975 | Schreiner | 363/68 |
| 4,156,222 | 4/1979 | Rossman et al. | 336/61 |
| 4,173,779 | 11/1979 | Abbondanti et al. | 363/27 |
| 4,275,430 | 6/1981 | Seki et al. | 361/91 |
| 4,319,318 | 3/1982 | Rippel et al. | 363/138 |
| 4,327,348 | 4/1982 | Hirayama | 336/181 |
| 4,329,674 | 4/1982 | Hamano | 336/92 |
| 4,506,196 | 3/1985 | Bees | 363/96 |
| 4,514,795 | 4/1985 | Van der Zwart | 363/27 |

Primary Examiner—Peter S. Wong
Assistant Examiner—Judson Jones
Attorney, Agent, or Firm—R. G. Brodahl

[57] ABSTRACT

A DC voltage converter apparatus is provided to convert a fluctuating input DC voltage into an isolated and regulated output DC voltage by operation of a first switch device for charging a capacitor through one primary winding of a transformer and a second switch device for discharging the capacitor through a second primary winding of that transformer. A load is energized by an output voltage from a first secondary winding when the first switch is conducting and is energized by an output voltage from a second secondary winding when the second switch is conducting. The first and second switching devices are controlled in response to the voltage change across the capacitor.

6 Claims, 4 Drawing Figures

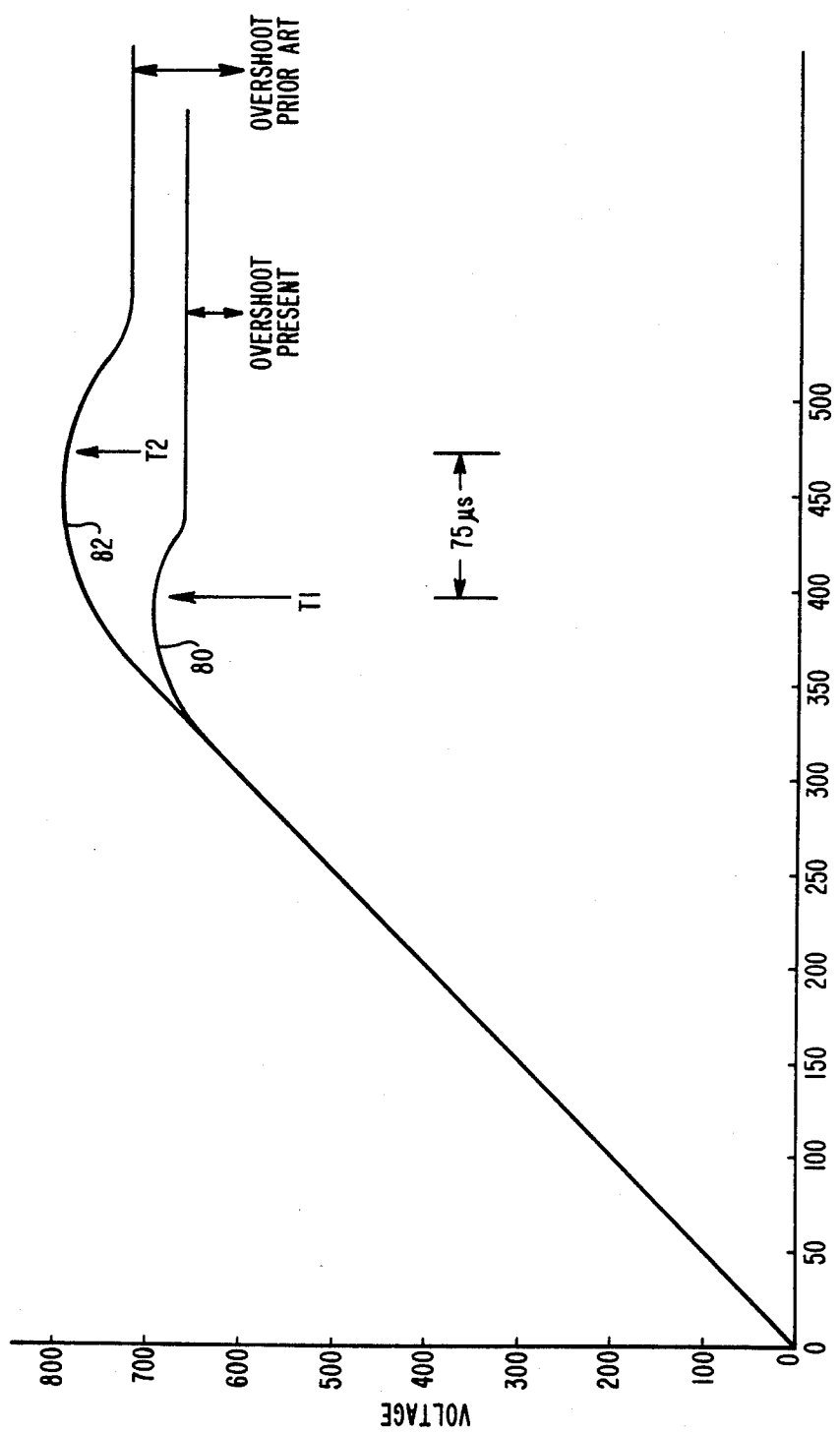

DIRECT CURRENT VOLTAGE CONVERTER APPARATUS

BACKGROUND OF THE INVENTION

It is known in the prior art to change an input fluctuating DC voltage into an isolated and regulated DC output voltage through respective thyristor switches by alternately charging and discharging a capacitor through a transformer. Each time an alternate thyristor is turned ON, the capacitor is either charged or discharged. Voltage sloping circuits have been used to reduce the rate of rise of the voltage applied to each one of the thyristors when the other thyristor is turned ON, which circuits in conjunction with the leakage reactance of the transformer provide a filter to change the voltage step function generated when one thyristor turns ON to a much slower voltage rise time on the other thyristor.

SUMMARY OF THE INVENTION

A DC to DC converter is provided for changing a fluctuating input DC voltage into a regulated AC voltage by alternately charging and discharging a capacitor through the divided primary windings of a transformer and then passing the output AC voltage from the divided secondary windings through a full wave rectifier coupled with a load. The timing of the charging and discharging of the capacitor is determined in response to the voltage change across the capacitor.

BRIEF DESCRIPTION OF THE DRAWINGS

FIG. 4 is a curve chart to illustrate the reduced cycle time of the present invention.

DESCRIPTION OF A PREFERRED EMBODIMENT

Figure 1:
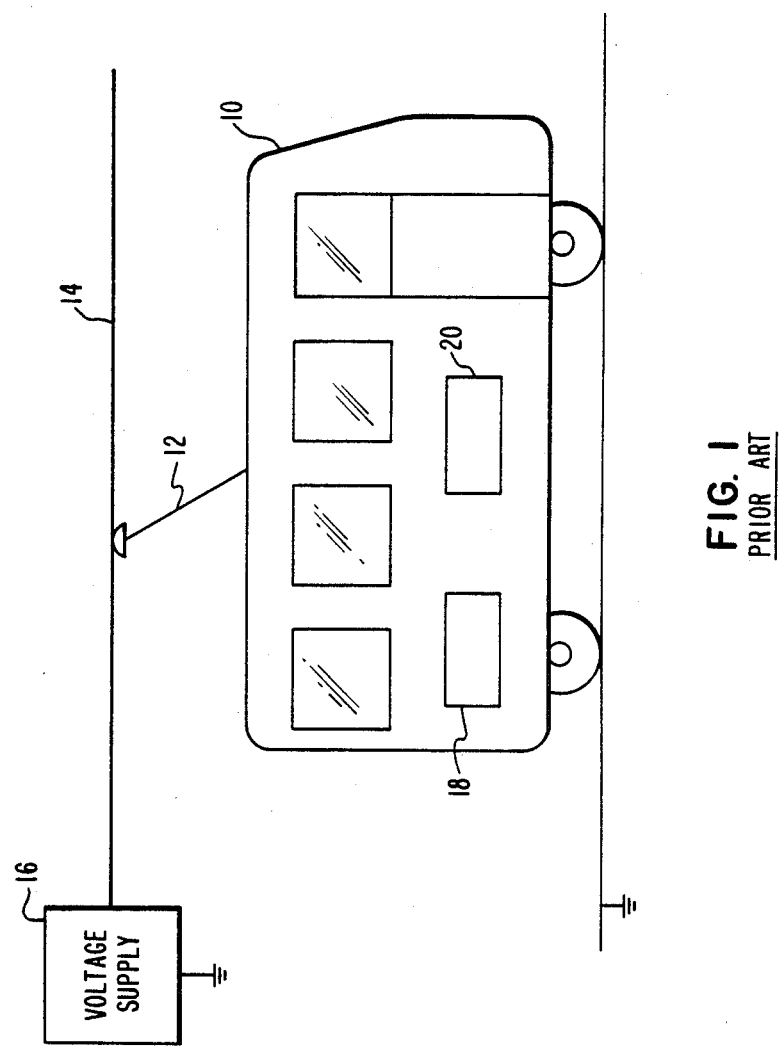
FIG. 1 shows a prior art transit vehicle energized by a suitable power supply.

In FIG. 1, there is shown a prior art transit vehicle 10 energized through a coupling 12 with a power conductor 14 operative with a voltage supply 16. The vehicle 10 includes the well-known propulsion motor apparatus 18 and the auxiliary load devices 20.

Figure 2:
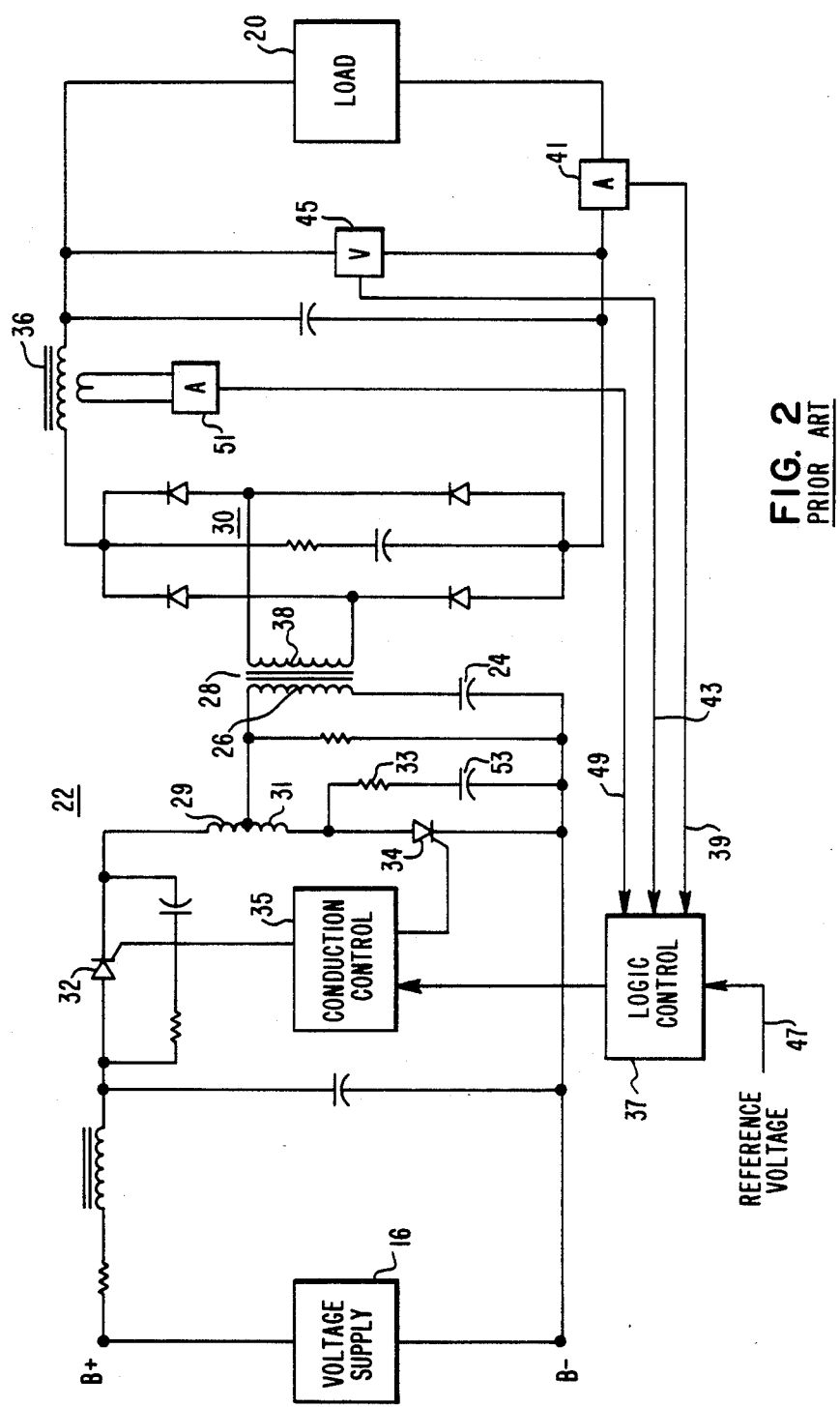
FIG. 2 shows a prior art DC to DC voltage converter apparatus.

In FIG. 2, there is shown a prior art DC to DC voltage converter for providing an isolated and regulated output DC voltage to the load 20, such as desired for the auxiliary load devices 20 shown in FIG. 1, from a fluctuating input DC voltage supply 16 such as provided by a typical transit system power supply. The voltage supply 16 provides a DC voltage output such as 600 volts to the converter 22 which transforms the input DC voltage to a desired regulated output DC voltage such as 37.5 volts for the load 20 by alternately charging and discharging a capacitor 24 through the primary winding 26 of a step-down transformer 28 and then rectifying the output of the transformer 28 through the full-wave rectifier 30. To alternately charge and discharge the capacitor 24, a series thyristor 32 and a shunt thyristor 34 are provided. When the series thyristor 32 is gated ON by conduction control 35, current flows from the 600 volt DC supply 16 through the primary 26 of the transformer 28 and through the inductor 29 to charge the capacitor 24. The inductor 36 coupled with the secondary winding 38 causes current to flow in the secondary winding 38 after the primary winding current has stopped, which free-wheeling action short circuits the transformer output voltage to cause the voltage across the capacitor 24 to overshoot and provide turn-OFF back bias of the thyristor 32. The operation of the conduction control 35 is determined by a logic control 37 in response to a first signal 39 from a current sensor 41 in the output load circuit for establishing when the output current is less than a desired output current limit, in response to a second signal 43 from a voltage sensor 45 across the load 20 for establishing when the output load voltage is greater than a reference voltage 47 such that no firing of the thyristors 32 and 34 is provided or when the output load voltage is less than the reference voltage 47 such that firing of the thyristors 32 and 34 is provided and in response to a third signal 49 from a current sensor 51 coupled with a small sensor winding coupled with the output inductor 36 for establishing when the current flow through the inductor 36 stops. After the current flow stops through the inductor 36, a predetermined time interval such as 100 microseconds is provided before the current flow through the second thyristor 34 is gated ON by the conduction control 35. This time delay provides the turn OFF time necessary for the series thyristor 32 to recover and return to its blocking state of operation. When the shunt thyristor 34 is gated ON, the previously charged capacitor 24 now discharges through the primary winding 26 of the transformer 28 and the inductor 31 to result in an AC signal being impressed on the primary winding 26. The free-wheeling action of the inductor 36 provides the turn OFF time for the shunt thyristor 34.

The capacitor 24 is a commutating capacitor and operates when one thyristor is turned ON such that the current flows through the primary 26 of the transformer 28 to charge the capacitor 24 in a first direction and when the capacitor 24 becomes charged current still continues to flow for a time period because the converter system is under-damped. The resulting voltage overshoot on the capacitor 24 then back biases the conducting thyristor 32 to bring the current flow to a halt and to provide turn OFF back bias voltage for the thyristor 32. The turn OFF back bias voltage continues until the other thyristor 34 is turned ON or until the inductor 36 current in the transformer secondary circuit stops. The transformer 28 is a step-down isolation transformer and isolates the primary high voltage from the output low voltage and provides a proper turns ratio to obtain the desired turn OFF time for the thyristors under low input voltage conditions. One purpose of the output inductor 36 is to control the wave shape of the current output from the transformer 28. A compromised balance is provided between an increase in the transformer size and an increase in the inductance value of the inductor 36 to provide a greater output current ripple filtering to decrease the ripple in the output DC voltage applied to the load 20.

When the thyristor 32 is gated ON, this applies a step function voltage across the thyristor 34. The inductors 29 and 31 in series with the thyristors 32 and 34 presents an impedance of about 90 micro-henry with the resistor 33 and capacitor 35 connected around the thyristor 34, and operates to slope the rate of rise of voltage across the thyristor 34 to provide a dv/dt characteristic of about 300 volts per microsecond across the thyristor 34 which is acceptably low. In addition, current flows through the inductor 29 and the primary winding 26 of the transformer 28 to charge the capacitor 24, with energy transfer being provided to the secondary winding 38 and the bridge rectifier 30 to energize the load 20. When the capacitor 24 is fully charged, the leakage reactance of the transformer 28 and the output inductor 36 cause the voltage of the capacitor 24 to overshoot. The secondary circuit operates in a free-wheeling manner and when that ring time is over, a back bias is applied to turn OFF the thyristor 32.

Figure 3:
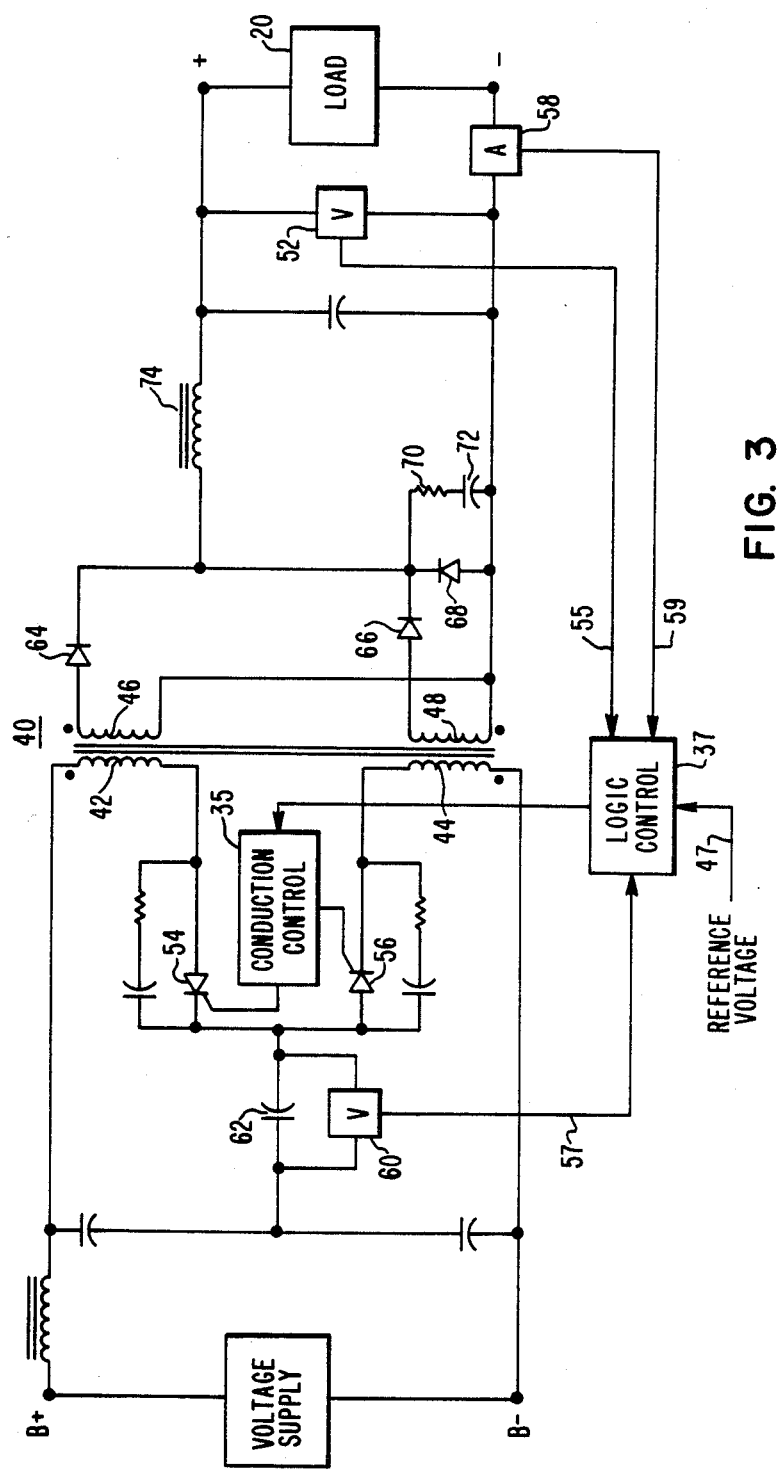
FIG. 3 shows the DC to DC voltage converter apparatus of the present invention.

In FIG. 3, there is shown the DC to DC voltage converter apparatus of the present invention. The isolation and step-down transformer 40 includes two primary windings 42 and 44 respectively coupled with two secondary windings 46 and 48 which are wound on a common core. A logic control 37 operates with the signal 55 provide by the voltage sensor 52 when the output voltage across the load 20 is lower than a desired reference voltage 47, such as 37.5 volts DC. In addition, the logic control 37 senses when the current through either thyristor 54 and 56 has stopped flowing by responding to signal 57 provided when the voltage sensor 60 determines there is no voltage change across the charging capacitor 62. Further, the logic control signal 59 provided by current sensor 58 to determine when the output load current is less than a desired current limit such as 200 amperes. The logic control 37 operates with the signal 61 provided by voltage sensor 60 when the voltage across the charging capacitor 62 is one of less than a predetermined reference such as 35 volts in the thyristor 54 gating cycle and greater than a second predetermined reference such as 420 volts in the thyristor 56 gating cycle.

The primary windings 42 and 44 are wound on respective legs of a core with a very low primary to secondary inductance. When the thyristor 54 is gated ON, current conducts through the primary winding 42 to charge the capacitor 62. The leakage inductance of the tightly coupled primary to secondary of the transformer 40 is low so that ring time is shorter as compared with the prior art charging circuit shown in FIG. 2. In addition, the leakage impedance of the primary winding 42 to primary winding 44 is very large such as 1.2 millihenry because the primary windings are each on a separate leg of the common core. The primary to secondary leakage inductance is about 70 micro-henry so the ring time is very short. For the purpose of dv/dt voltage change instead of having 90 micro-henry for the series inductance of the prior art inductors 29 and 31 in FIG. 2, the leakage reactance of primary winding 42 to primary winding 44 is about 1.2 milli-henry in FIG. 3.

Each of the primary windings 42 and 44 is wound on separate legs of an iron core, which halves are put together to form a toroidal core and a small air gap of about 3 or 4 mils is included in the core and located between these primary windings 42 and 44 to reduce the core saturation in transient modes. The secondary winding 46 is wound on top of the primary winding 42 and the secondary winding 48 is wound on top of the primary winding 44. The polarities of a primary windings 42 and 44 are opposite in relation to each other as shown in FIG. 3, and each of windings 42 and 44 has the same number of turns in an effort to prevent a DC offset voltage component.

The transformer 40 operates to provide the required primary to primary impedance to protect the non-conducting thyristor in relation to rate of rise of voltage to result in a dv/dt voltage rise in FIG. 3 about one-fifth of the rate of voltage rise previously provided with the prior art apparatus shown in FIG. 2.

When the thyristor 54 is gated ON, current flows through the primary winding 42 and the capacitor 62 until the voltage across the capacitor 62 equals the input voltage. The stored energy in the leakage reactance of the transformer 40 causes the voltage of the capacitor 62 to overshoot and be higher than the input voltage which operates to back bias the thyristor 54 and stop current flow through the thyristor 54, which current halt is detected by the voltage sensor 60 and the logic control 37 then waits 100 microseconds before gating ON the other thyristor 56. The voltage sensor 60 senses the change of voltage across the capacitor 62 and when this voltage is no longer changing, the current through the capacitor 62 is assumed to be zero.

In FIG. 4 there is shown a curve chart to illustrate the operation of the improved voltage converter of FIG. 3 as shown by the charging capacitor 62 voltage curve 80 as compared to the operation of the prior art voltage converter of FIG. 2 as shown by the charging capacitor 24 voltage curve 82. The current flow through capacitor 62 is zero at time T1 in relation to curve 80 and the current flow through capacitor 24 is zero at time T2 in relation to curve 82. The improvement in the cycle time is about 75 microseconds less for the improved voltage converter shown in FIG. 3. This shorter cycle time permits firing the thyristors 54 and 56 faster to increase the available output current, so the shape of the initial portion of the voltage curves shown in FIG. 4 would then become steeper, and this allows full output current rating at a lower input voltage of about 450 volts when using the same rated thyristors, as compared with the prior art converter of FIG. 2 which could provide full output current rating only down to an input voltage of about 550 volts.

When the thyristor 54 is gated ON, the voltage at the dotted top of the primary winding 42 goes positive while the voltage of the reversed bottom primary winding 44 is such that the top of the bottom primary winding 44 goes negative. The voltage change or dv/dt across the thyristor 56 is the sum of the increasing voltage across the capacitor 62 with respect to ground and the negative voltage with respect to ground across the secondary primary winding 44. This results in about 80 to 90 volts per microsecond across the thyristor 54 in FIG. 3 as compared to the previously provided 300 to 350 volts per microsecond provided across the thyristor 34 in the operation of the prior art converter circuit. Since the leakage reactance of the primary to secondary of the transformer 40 which is in series with capacitor 62 is reduced in FIG. 3, the ringing up of the voltage change time until the current through the capacitor 62 halts is reduced by about 65 to 75 microseconds as shown in FIG. 4. No output current to the load 20 is provided during this ring time because the free-wheeling current in the secondary of the transformer 40 exceeds the input current so energy is instead being stored in the condenser 62. By reducing this ring time, the converter operation can now go to a higher frequency and the current to the capacitor 62 increases which causes the capacitor 62 to charge faster.

The diodes 64 and 66 in the secondary circuit of the transformer 40 operate to rectify the output of transformer 40 to provide DC voltage to the load 20. The diode 68 is provided as a free-wheeling diode, with the resistor 70 and capacitor 72 providing an RC network to filter any transient currents. The output inductor 74 controls the wave shape across the charging capacitor 62 as reflected through the transformer 40 by the turns ratio of the transformer to control the current waveform through the capacitor 62 until the free-wheeling action causes the transformer 40 to appear short-circuited. As the current in the primary is decreasing and the current in the secondary is free-wheeling, the primary current goes below the secondary current to make the transformer appear to be short-circuited.

The logic control 37 senses the regulated output voltage to the load 20 with the volt sensor 52 and compares this with a desired reference value 47, such as 37.5 volts DC, to determine the need to fire and request the firing of the thyristors 54 and 56 to provide AC charging and discharging current in relation to capacitor 62 as provided through the respective primary windings 42 and 44 of the transformer 40. In addition, the logic control 37 senses when the voltage change across the capacitor 62 stops to indicate there is no current flow through one of the thyristors 54 and 56 for initiating the 100 microsecond delay period before firing the other thyristor.

Once the set of two thyristors 54 and 56 has been fired, the logic control 50 then determines if and when the set should be fired again. The current transferred from the primary to the secondary and to the load is one-half CV$^2$. If this transfer is done 1200 times a second depending on the input voltage, several kilowatts of power is provided to the load. By varying the frequency of this thyristor set toggle back and forth operation, the output voltage to the load is regulated as desired. If the output voltage goes too high, the thyristor 54 and 56 do not fire and if this voltage goes too low, these thyristors do fire.

The three or four mil gap in the transformer core is provided since it is difficult to perfectly balance the volt seconds of the two primary windings 42 and 44 which can otherwise result in a small DC voltage component in relation to the transformer 40.

The prior art voltage converter shown in FIG. 2 operates to provide a discontinuous current flow in the secondary to the load 20, since the current sensor 51 operates to sense when the free-wheeling current flow stops through the inductor 36 for determining the start of a predetermined delay time interval before the second thyristor 34 is gated ON to provide a succceeding current flow through the inductor 36. The improved voltage converter of the present invention as shown in FIG. 3 operates to provide a continuous current flow in the secondary to the load 20, since the voltage sensor 60 indicates when there is no voltage change across the charging capacitor 62 to establish the operation of the charging capacitor 62 in relation to the thyristors 54 and 56, and in this way the conduction control 35 fires the thyristors as required to increase or to decrease the output current flow through the inductor 74 for establishing a desired output current flow to the load 20.

An embodiment of the present invention as shown in FIG. 3 was made using the following component values:

C62: 25 microfarad
L74: 360 microhenry at 215 amperes

The leakage inductance of primary winding 26 was about 195 microhenry when secondary winding 38 appeared to be shorted by the free-wheeling secondary operation. The leakage inductance of primary winding 42 was about 80 microhenry in when the secondary winding 46 appeared to be shorted by free-wheeling secondary operation. The leakage inductance of primary winding 42 was about 1.2 milihenry when the secondary winding 48 appeared to be shorted by free-wheeling secondary operation. The leakage inductances of primary windings were similar since the transformer operation was substantially symmetrical.

We claim:

1. In voltage converter apparatus operative with an input voltage source to provide an output voltage to a load, the combination of:

current storage means, transformer means having a first primary winding coupled with a first secondary winding and having a second primary winding coupled with a second secondary winding, first switch means coupled with the input voltage source for charging the current storage means with a first current through the first primary winding, second switch means coupled with the current storage means for discharging the current storage means with a second current through the second primary winding of the transformer means, first rectifier means coupled with the first secondary winding to provide said output voltage to the load when the first switch means is conductive, and second rectifier means coupled with the second secondary winding to provide said output voltage to the load when the second switch means is conductive.

2. The voltage converter apparatus of claim 1, including means sensing the voltage change across the capacitor and coupled with the first and second rectifier means for controlling the respective conductive time periods of the first and second rectifier means.

3. The voltage converter apparatus of claim 1, with the transformer means including a core and having the first primary winding wound on one leg of the core and the second primary winding wound on the other leg of the core and including a small air gap in the core to determine the core saturation in transient modes.

4. The voltage converter apparatus of claim 1, with the first primary winding having an opposite polarity in relation to the second primary winding to reduce the voltage change across one of the first and second switch means when the other of said switch means is made conductive.

5. The voltage converter apparatus of claim 1, with the first primary winding having an opposite polarity and the same number of windings in relation to the second primary winding to reduce the DC offset voltage component of the transformer.

6. The voltage converter apparatus of claim 1 for providing a desired output voltage to the load, and including means sensing the actual output voltage to the load, means sensing the voltage change across the capacitor and coupled with the first and second switch means for determining the frequency of the conduction of the first and second switch means in response to a comparison of said actual output voltage with the desired output voltage.

* * * * *